US008930636B2

(12) United States Patent
McCormack et al.

(10) Patent No.: US 8,930,636 B2
(45) Date of Patent: Jan. 6, 2015

(54) RELAXED COHERENCY BETWEEN DIFFERENT CACHES

(75) Inventors: Joel James McCormack, Boulder, CO (US); Rajesh Kota, Austin, TX (US); Olivier Giroux, San Jose, CA (US); Emmett M. Kilgariff, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 349 days.

(21) Appl. No.: 13/555,048

(22) Filed: Jul. 20, 2012

(65) Prior Publication Data

US 2014/0025891 A1 Jan. 23, 2014

(51) Int. Cl.
G06F 12/08 (2006.01)
(52) U.S. Cl.
USPC .......................................... 711/141; 711/119
(58) Field of Classification Search
USPC .................................................. 711/119, 141
See application file for complete search history.

(56) References Cited

U.S. PATENT DOCUMENTS

2014/0118352 A1* 5/2014 Hakura et al. ................ 345/426
2014/0118362 A1* 5/2014 Hakura et al. ................ 345/505

* cited by examiner

Primary Examiner — Reginald Bragdon
Assistant Examiner — Mehdi Namazi
(74) Attorney, Agent, or Firm — Patterson & Sheridan, LLP

(57) ABSTRACT

One embodiment sets forth a technique for ensuring relaxed coherency between different caches. Two different execution units may be configured to access different caches that may store one or more cache lines corresponding to the same memory address. During time periods between memory barrier instructions relaxed coherency is maintained between the different caches. More specifically, writes to a cache line in a first cache that corresponds to a particular memory address are not necessarily propagated to a cache line in a second cache before the second cache receives a read or write request that also corresponds to the particular memory address. Therefore, the first cache and the second are not necessarily coherent during time periods of relaxed coherency. Execution of a memory barrier instruction ensures that the different caches will be coherent before a new period of relaxed coherency begins.

20 Claims, 13 Drawing Sheets

RELAXED COHERENCY BETWEEN DIFFERENT CACHES

BACKGROUND OF THE INVENTION

1. Field of the Invention

Embodiments of the invention relate generally to cache coherency, and more specifically, to maintaining relaxed coherency between different caches that may store the same cache lines.

2. Description of the Related Art

Conventional parallel processing architectures support execution of multiple threads and the multiple threads access memory through a single cache. Therefore, when a first thread writes data to a location in memory, the data is stored in the cache. When a second thread reads the same location from memory, the data is retrieved from the cache. Because the first thread and the second thread share the same cache, the first thread and the second thread see a consistent view of the memory.

When the single cache is replaced with a first cache and a second cache that are accessed by different portions of the multiple threads, a mechanism may be needed to maintain coherence between the first and second caches. For example, the first thread may write data to a location in memory and then the second thread may read the same location in the memory. If the first thread writes the data to the first cache and the second thread reads data from the second cache, the second thread is not guaranteed to read the data that was written by the first thread. A mechanism is needed to maintain coherence between the first cache and the second cache.

One mechanism that may used to maintain coherence between the first and second cache is to broadcast write operations for each of the multiple threads to both caches. A first drawback of this mechanism is that wires are needed to broadcast the write operations to both caches. A second drawback of this mechanism is that the total number of cache writes increases, thereby consuming bandwidth that could be used to perform other cache write operations or cache read operations.

Accordingly, what is needed in the art is an improved technique for maintaining coherence between a first cache and a second cache when different portions of multiple parallel threads access both caches.

SUMMARY OF THE INVENTION

One embodiment of the present invention sets forth a system and method for maintaining relaxed coherency between a first cache and a second cache. The method includes receiving a write request corresponding to a first cache line of the first cache during a first time period when relaxed coherency is maintained between the first cache and the second cache. An invalidate command that is based on the write request is transmitted to the second cache to generate a pending invalidate command for execution by the second cache, where the pending invalidate command is executed by the second cache at any time during the first time period. A memory barrier instruction configured to ensure that data written by the write request can be read by a read request that is received after the barrier instruction is received. The second cache does not accept either a new read request or a new write request until the pending invalidate command is executed by the second cache to complete execution of the memory barrier instruction and end the first time period end.

One advantage of the disclosed system and method is that during time periods between memory barrier instructions relaxed coherency is maintained between the different caches. More specifically, writes to a cache line in a first cache that corresponds to a particular memory address are not necessarily propagated to a cache line in a second cache before the second cache receives a read or write request that also corresponds to the particular memory address. Therefore, the first cache and the second are not necessarily coherent during time periods of relaxed coherency. Execution of a memory barrier instruction ensures that the different caches will be coherent before a new period of relaxed coherency begins.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
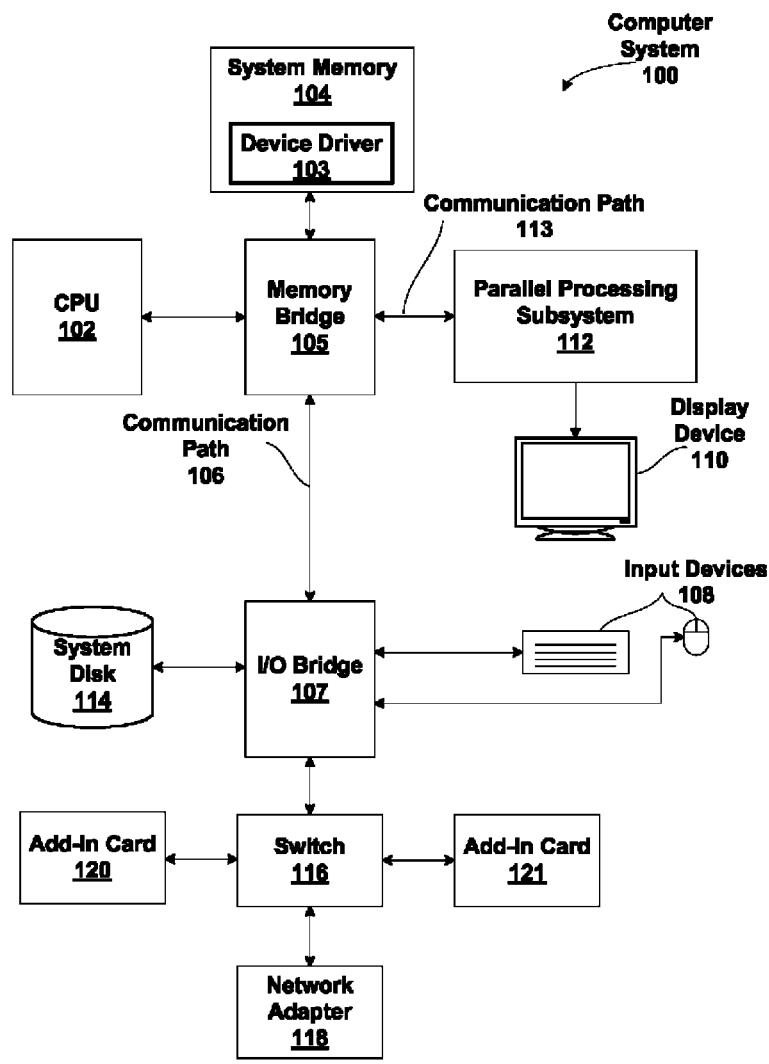
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
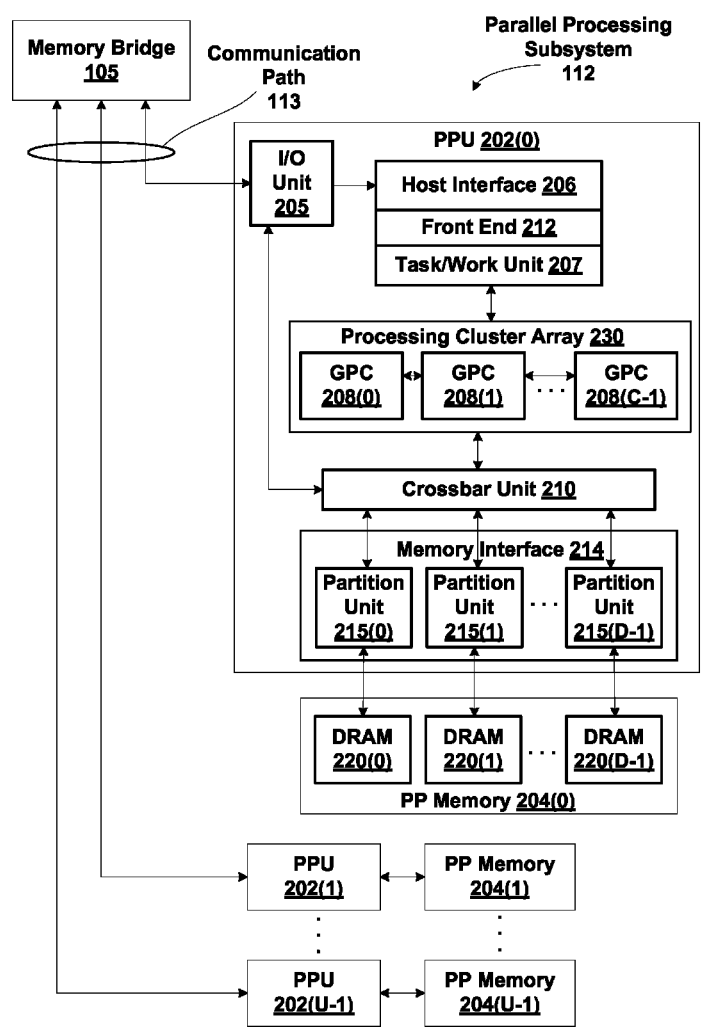
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is directly coupled to a parallel processing (PP) memory 204. In general, a parallel processing subsystem includes a number U of PPUs, where U>1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C 1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where $D \geq 1$. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to parallel processing memory 204, thereby enabling the processing cores within the different GPCs 208 to communicate with system memory 104 or other memory that is not directly coupled to the PPU 202 in which the GPC 203 resides. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or parallel processing memories 204 into internal (on-chip) memory, process the data, and write result data back to system memory 104 and/or parallel processing memories 204, where such data can be accessed by other system components, including CPU 102 or another parallel processing subsystem 112.

A PPU 202 may be provided with any amount of parallel processing memory 204, including no memory, and may use memory that is directly coupled to the PPUs 202 and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple Concurrent Task Scheduling

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3A:
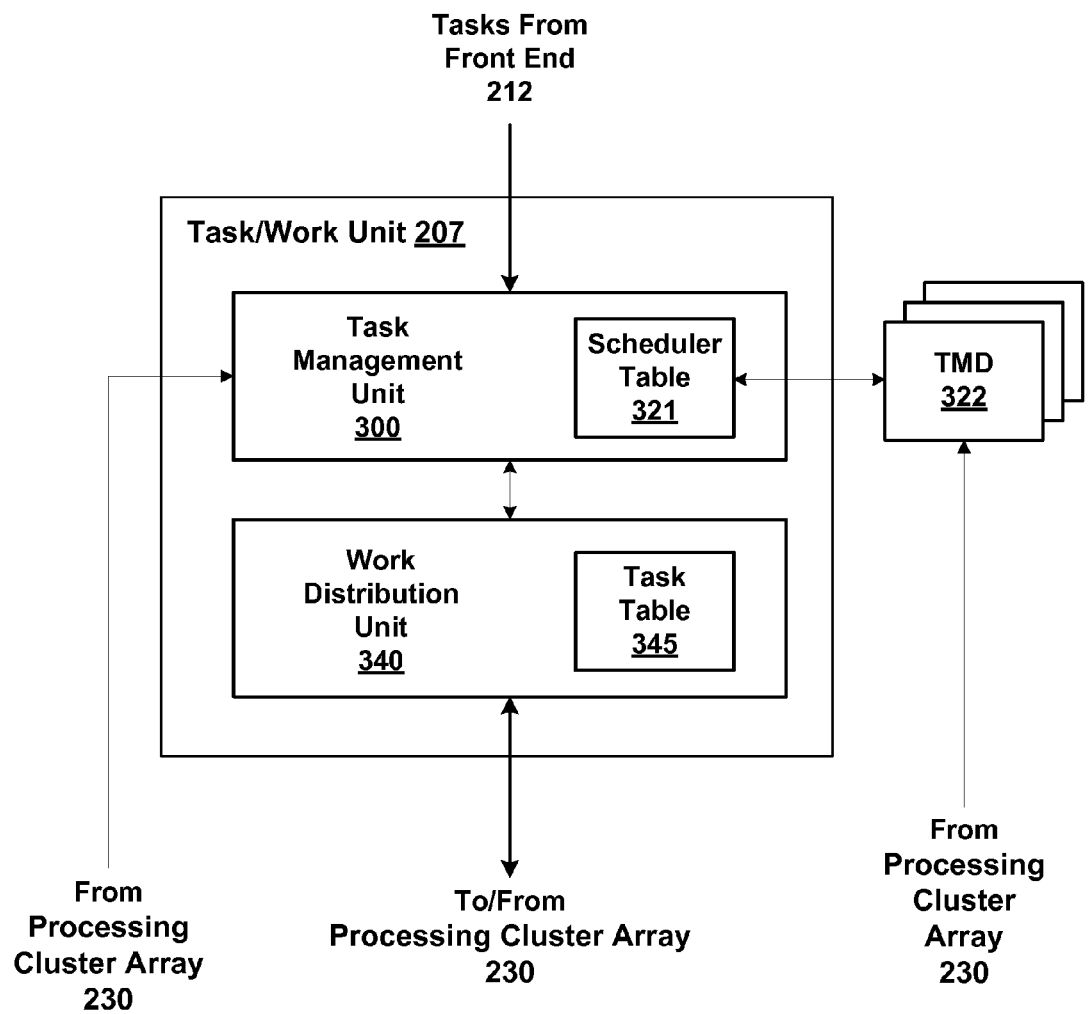
FIG. 3A is a block diagram of a task/work unit of FIG. 2, according to one embodiment of the present invention.

FIG. 3A is a block diagram of the task/work unit 207 of FIG. 2, according to one embodiment of the present invention. The task/work unit 207 includes a task management unit 300 and the work distribution unit 340. The task management unit 300 organizes tasks to be scheduled based on execution priority levels. For each priority level, the task management unit 300 stores a list of pointers to the TMDs 322 corresponding to the tasks in the scheduler table 321, where the list may be implemented as a linked list. The TMDs 322 may be stored in the PP memory 204 or system memory 104. The rate at which the task management unit 300 accepts tasks and stores the tasks in the scheduler table 321 is decoupled from the rate at which the task management unit 300 schedules tasks for execution. Therefore, the task management unit 300 may collect several tasks before scheduling the tasks. The collected tasks may then be scheduled, based on priority information or using other techniques, such as round-robin scheduling.

The work distribution unit 340 includes a task table 345 with slots that may each be occupied by the TMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and if execution of the task is not complete, then a pointer to the task is added to a list of task pointers to be scheduled so that execution of the task will resume at a later time. When a child processing task is generated, during execution of a task, a pointer to the child task is added to the list of task pointers to be scheduled. A child task may be generated by a TMD 322 executing in the processing cluster array 230.

Unlike a task that is received by the task/work unit 207 from the front end 212, child tasks are received from the processing cluster array 230. Child tasks are not inserted into pushbuffers or transmitted to the front end. The CPU 102 is not notified when a child task is generated or data for the child task is stored in memory. Another difference between the tasks that are provided through pushbuffers and child tasks is that the tasks provided through the pushbuffers are defined by the application program whereas the child tasks are dynamically generated during execution of the tasks.

Task Processing Overview

Figure 3B:
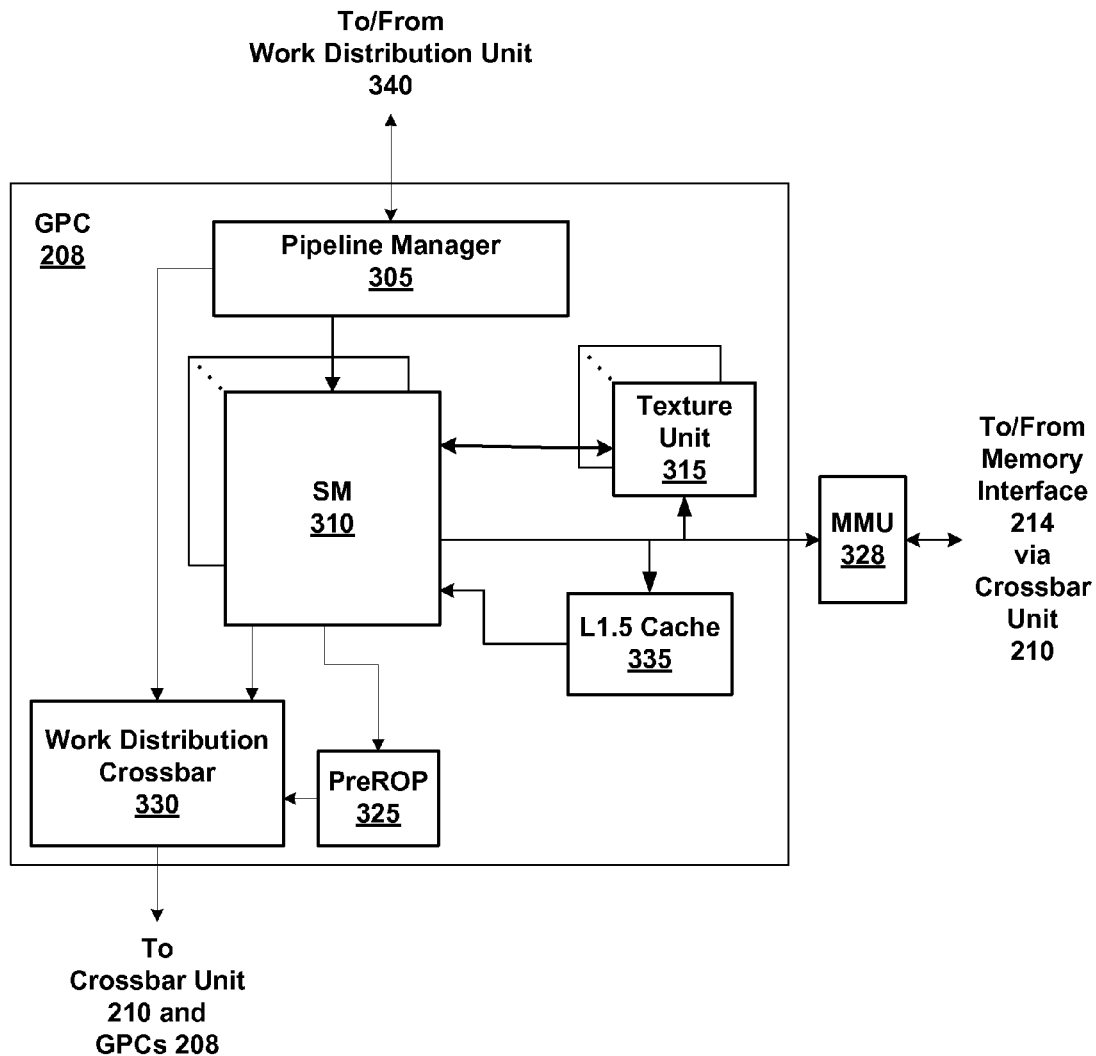
FIG. 3B is a block diagram of a GPC within one of the PPUs of FIG. 2, according to one embodiment of the present invention.

FIG. 3B is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager 305 that distributes processing tasks to streaming multiprocessors (SMs) 310. Pipeline manager 305 may also be configured to control a work distribution crossbar 330 by specifying destinations for processed data output by SMs 310.

In one embodiment, each GPC 208 includes a number M of SMs 310, where M≥1, each SM 310 configured to process one or more thread groups. Also, each SM 310 advantageously includes an identical set of functional execution units (e.g., execution units and load-store units) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

Each SM 310 contains a level one (L1) cache or uses space in a corresponding L1 cache outside of the SM 310 that is used to perform load and store operations. Each SM 310 also has access to level two (L2) caches that are shared among all GPCs 208 and may be used to transfer data between threads. Finally, SMs 310 also have access to parallel processing memory 204 and/or system memory 104. Additionally, a level one-point-five (L1.5) cache 335 may be included within the GPC 208, configured to receive and hold data fetched from memory via memory interface 214 requested by SM 310, including instructions, uniform data, and constant data, and provide the requested data to SM 310. Embodiments having multiple SMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SM 310 or the L1 cache or GPC 208. The physical address is processed to distribute surface data access locality to allow efficient request interleaving among partition units 215. The cache line index may be used to determine whether or not a request for a cache line is a hit or miss.

In graphics and computing applications, a GPC 208 may be configured such that each SM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SM 310 and is fetched from an L2 cache that is shared between all GPCs 208, parallel processing memory 204, or system memory 104, as needed. Each SM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMs 310 or texture units 315, preROPs 325 may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Relaxed Memory Operation Ordering

The computing system 100 provides a many-core high performance compute platform for academic research, commercial, and consumer applications across a broad range of problem spaces. Among key components of the architecture are the memory hierarchy that supports accesses to parallel processing memory (DRAM) and system memory and the SM 310 that supports the simultaneous scheduling and execution of multiple threads in a CTA. In one embodiment, up to 1024 threads are included in a CTA, where 32 threads are collected into an execution unit called a warp, as previously defined herein. All active threads within the warp execute the same instruction but with independent address, data, register, and control state. Memory operations must be managed carefully in this SIMT environment to ensure correct program behavior.

A relaxed memory ordering model is used that allows flexibility in how memory operations are issued, accepted, and ordered throughout the system. More specifically, memory operations can be performed in any order except with respect to LOAD and STORE operations from the same thread to the same memory address. LOAD and STORE operations from any one thread to the same memory address must be performed with respect to just that thread in program order of those LOAD and STORE operations. This flexibility allows for increased performance in general, but correct program execution may require certain points in memory transactions around which an order is guaranteed between different threads. In these cases, a memory barrier (MEMBAR) instruction is used to ensure that all memory transactions issued before the MEMBAR instruction are sufficiently performed so that STORE results are visible to, and LOAD results are not affected by, any memory transactions issued after the MEMBAR instruction.

From the standpoint of a single thread running alone, memory operations to a given address must appear to be performed in program order. This matches normal C program semantics, and is necessary for the CUDA programming model. Once multiple threads are involved, memory ordering becomes more complex, and must be defined in terms of when a memory transaction is "performed", and thus visible to other threads and memory clients. For example, when a first thread in a CTA produces data for consumption by another thread in the CTA, the first thread writes the data (i.e., performs a STORE operation) and the second thread reads the data (i.e., performs a LOAD operation). Before the second thread reads data from a location in shared memory that was written by the first thread, the write should be completed to a point where the data will be visible to the second thread so that the second thread does not read "stale" data.

The programming model used by the computer system 100 recognizes three levels of affinity for memory clients: threads in the same CTA ("CTA" level), threads and other clients in the same PPU 202 ("global" level), and all threads and clients with access to the same memory in the computer system 100, including the host CPU 102 and peer PPUs 202 ("system" level). Other embodiments may support other affinity levels for MEMBAR instructions, including a thread (self) affinity level, and a warp affinity level (the set of threads that execute a SIMT or SIMD instruction together). In one embodiment, each individual thread accesses dedicated local memory that can only be accessed by the individual thread and is therefore, by definition coherent for the individual thread. In the context of the computer system 100, a memory transaction is considered "performed" when it has been committed to memory order and is visible to all other threads and clients at the indicated level of affinity. For example, a read by a first thread in a CTA is considered "performed" at the CTA level with respect to other threads in a CTA at a point in time when the issuing of a write to the same address by one of the other threads in the CTA cannot affect the value returned to the first thread. In another example, a write by the first thread in a CTA is considered "performed" at the CTA level at a point in time when an issued read to the same address by another thread in the CTA returns the value defined by the write; threads that are not in the same CTA may or may not see the result of the write by the first thread. In general, it is faster and less expensive to perform memory operations at the lower affinity levels of visibility. In one embodiment, the CTA affinity level is the lowest level is the lowest affinity level and the system affinity level is the highest affinity level. In other embodiments, the thread or warp affinity level is the lowest level.

In this discussion, the term "load" or "read" is used to describe a class of instructions that read and return a value from memory, while "store" or "write" describes instructions that write a value to memory. Some instructions, such as atomic and locking operations, read and modify memory and return values, and thus should be considered to have both load and store semantics, and thus follow both load and store ordering rules.

There are many definitions and ordering rules for the overall memory consistency model. Memory ordering rules specific to MEMBAR operations are defined in terms of two orders: program order and dependence order. Program order requires that memory operations are performed in the exact sequential order as the instructions are in the program, or in an order that guarantees the same results as when the memory operations are performed in the exact sequential order. Dependence order is a partial ordering that describes the constraints that hold between instructions in a thread that access the same register or memory location. This covers data dependencies, such as values passed through scoreboarded resources such as the register file, condition code register, or predicate registers; and also includes control dependencies, such as a write following a conditional branch.

The relaxed memory ordering rules have implications for memory transactions. For example, if one thread stores to two different addresses, another thread could see those stores in any order. To enforce an inter-thread or inter-address order on memory transactions, the program must execute a MEMBAR instruction. MEMBAR effectively inserts a fence in the stream of memory operations, such that operations executed by this thread prior to the MEMBAR are guaranteed to be performed before memory operations executed after the MEMBAR. It is also the responsibility of a thread that is reading data written by another thread, to execute a MEMBAR between read operations that it expects to be performed in a specific order, unless this order is established via other ordering rules such as dependency.

There are multiple levels of MEMBAR instructions that differ in the scope of other threads that are affected. MEMBAR.CTA enforces memory ordering among threads in the CTA and MEMBAR.SYS enforces ordering at the system level (e.g. including system and peer memory). The MEMBAR.CTA ensures that all prior memory transactions are committed at a CTA level such that they are visible to all threads in the same CTA. The MEMBAR.SYS ensures that all prior memory transactions are committed at a system level such that they are visible to all threads and clients in the system.

These different MEMBAR levels form a hierarchy, and a MEMBAR at any level implies ordering at the lower levels. Thus, MEMBAR.SYS implies MEMBAR.CTA. Note that these orderings are defined in terms of threads, and not in terms of a physical memory hierarchy (e.g., L1 and L2 caches, shared memory, and memory that is directly or indirectly coupled to the PPUs 202, such as the DRAM 220 and system memory 104). Specifically, threads within a CTA can communicate through memory using MEMBAR.CTA to order their transactions, which is typically lower latency than using MEMBAR.SYS. Other embodiments may include additional affinity levels, including MEMBAR.WARP for ordering transactions among the threads comprising a warp.

Relaxed Coherency Between Different Caches

When all of the threads within a CTA access memory through a single cache, such as the L1.5 cache 335 shown in FIG. 3B, execution of a MEMBAR.CTA is complete when all memory transactions prior to the MEMBAR.CTA have been performed by the L1.5 cache 335 because all threads in the CTA have to go through the L1.5 cache 335. However, in some embodiments, the threads of a CTA may be partitioned into disjoint sets, where each disjoint set accesses a different physical L1 cache. For example, caches within the texture units 315 may be used to store data for a CTA. A mechanism is needed to ensure that the coherency is restored between the different caches that store data for a CTA when a MEMBAR.CTA is executed. Note, that cache coherency is only relevant for accesses to global memory because local memory accesses are only visible to an individual thread and are therefore coherent by definition.

Figure 4A:
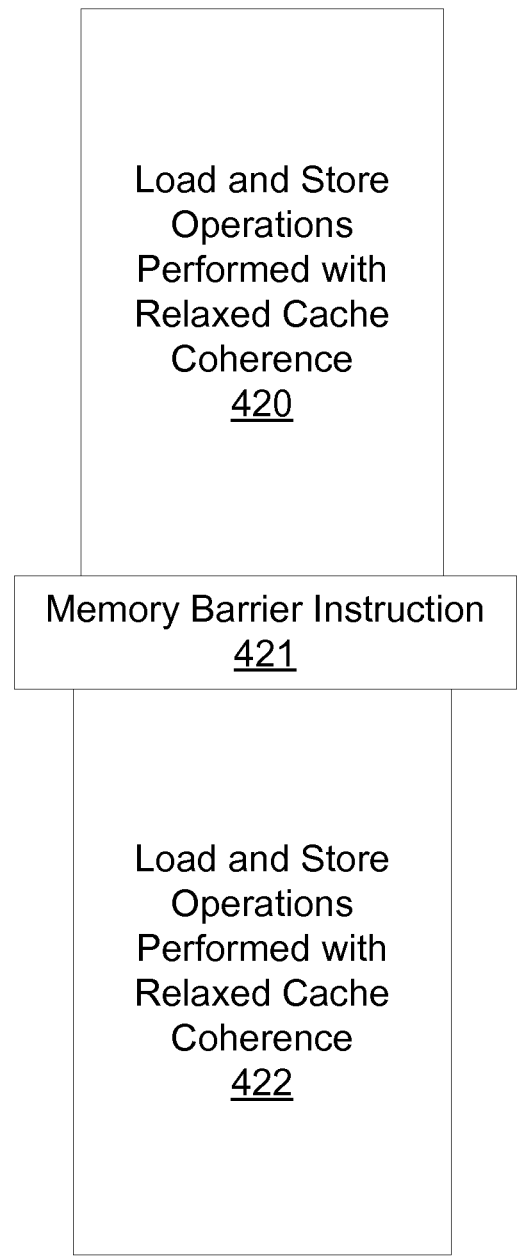
FIG. 4A is a conceptual diagram illustrating a memory barrier instruction within a sequence of load and store operations, according to one embodiment of the present invention.

FIG. 4A is a conceptual diagram illustrating a memory barrier instruction 421 within a sequence of load and store operations, according to one embodiment of the present invention. The load and store operations with relaxed cache coherence 420 that precede the memory barrier instruction 421 will be performed before any of the load and store operations with relaxed cache coherence 422 for threads within a CTA. In one embodiment, when a MEMBAR.CTA is received all cache lines storing global memory data are invalidated so that any subsequent loads of global memory data are refetched from the L2 cache (the L2 cache is coherent using mechanisms suited to the L2 cache data access patterns.). However, the latency to load data from global memory is increased. In other embodiments, only cache lines storing global memory data that was written between each MEMBAR.CTA are invalidated.

In one embodiment, an invalidation command is sent to sibling caches when a write request for a thread is received by a first cache. A sibling cache is another L1 cache that is accessed by one or more threads within the same CTA. The memory barrier instruction 421 is also sent as a memory barrier message to sibling caches to ensure that all read or write requests prior to the memory barrier instruction 421 are processed before any read or write request accessing global memory that is subsequent to the memory barrier instruction 421 is processed for a thread. Invalidation messages between two memory barrier messages may be combined or agglomerated for processing efficiency, as described further herein.

Figure 4B:
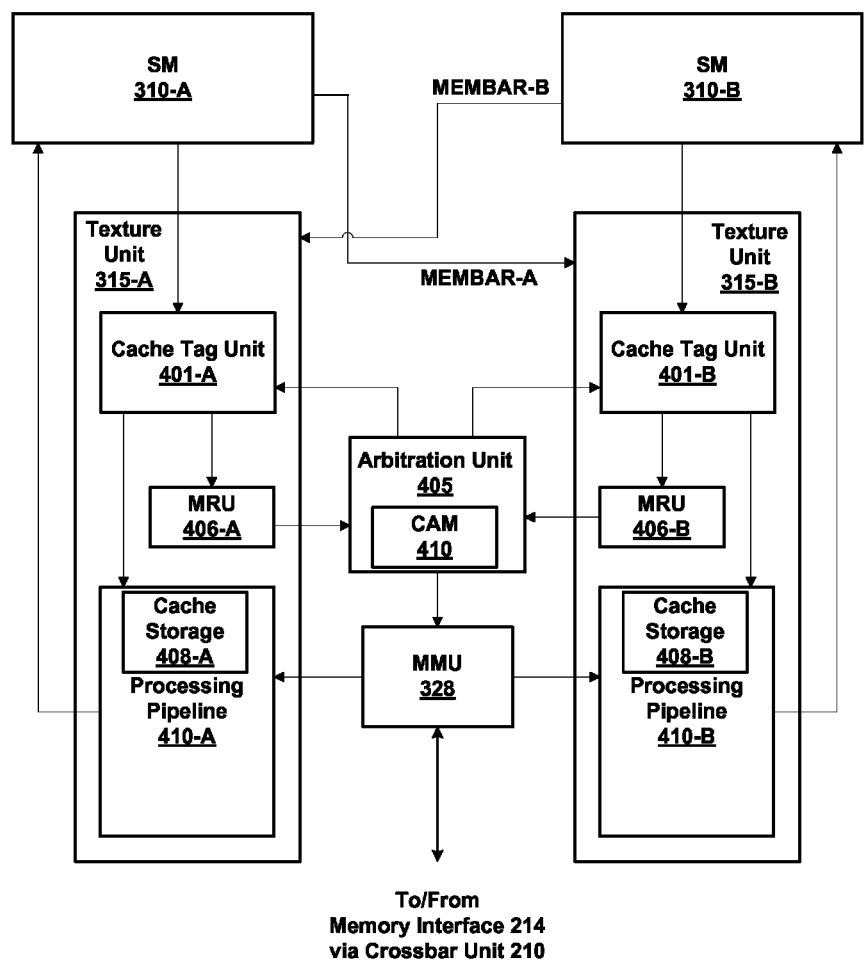
FIG. 4B is a block diagram of a portion of the GPC of FIG. 3B, according to one embodiment of the present invention.

FIG. 4B is a block diagram of a portion of the GPC 208 of FIG. 3B, according to one embodiment of the present invention. In one embodiment each SM 310, two of which are shown in FIG. 4B, is configured to access one or more "texture" caches within each texture unit 315-A and 315-B. Each texture cache is a combination of a cache tag unit 401-A and 401-B and cache storage 408-A and 408-B, respectively. The cache storage 408-A and 408-B store data that is has been read from memory and data that will be written to memory. The cache tag units 401-A and 401-B track the status of entries (cache lines) in the cache storage 408-A and 408-B, respectively. When a CTA executes on SM 310-A and SM 310-B, the texture caches within texture unit 315-A and 315-B are sibling caches.

The texture units 315-A and 315-B share an arbitration unit 405 that provides access requests to the MMU 328. The texture units 315-A and 315-B read data from and write data to memory through the texture caches independently. However, the texture units 315-A and 315-B share the arbitration unit 405, and therefore, the global memory access requests received by texture units 315-A and 315-B are ordered into a single stream by the arbitration unit 405. The arbitration unit 405 is able to ensure that the relaxed coherency is maintained between the texture caches residing within the texture unit 315-A and 315-B.

The portion of the GPC 208 shown in FIG. 4B includes an SM 310-A and an SM 310-B that are configured to process one or more CTAS. SM 310-A is coupled to a texture unit 315-A and SM 310-B is coupled to a texture unit 315-B. The texture unit 315-A receives a stream of load and store requests that includes MEMBAR.CTA instructions from SM 310-A and the texture unit 315-B receives a separate stream of load and store requests that includes MEMBAR.CTA instructions from SM 310-B. The cache tag units 401-A and 401-B are configured to maintain relaxed coherency between texture storage 408-A and 408-B, respectively. The relaxed coherency is maintained by invalidating cache tags in the cache tag unit 401-A and 401-B.

When a MEMBAR.CTA is at the output of SM 310-A, the SM 310-A transmits a MEMBAR-A instruction to the texture units 315-A and 315-B. Similarly, when a MEMBAR.CTA is at the output of SM 310-B, the SM 310-B transmits a MEMBAR-B instruction to the texture units 315-A and 315-B. SM 310-A is considered to be a sibling of SM 310-B when a CTA is executed by SM 310-A and SM 310-B. After outputting the MEMBAR-A and/or MEMBAR-B instruction, the SM 310-A and/or 310-B can then proceed to issue instructions that follow the MEMBAR.CTA instruction. Importantly, subsequent global memory operations are not stalled at the output of the SM 310-A and SM 310-B. Instead, global memory operations are stalled at a later point which reduces the length of time during which the pipeline is stalled When a CTA spans only one texture cache, i.e., is processed within a single SM 310 and texture unit 315, no invalidation command is sent to a sibling cache, no MEMBAR instruction is transmitted to another SM 310, and no MEMBAR instruction is output to a texture unit 315. When only a single texture cache is accessed by a CTA, coherence is guaranteed. Each global write instruction and each MEMBAR instruction that is output by an SM 310 contains a sibling cache mask indicating which texture caches are siblings for the CTA executing the write instruction or MEMBAR instruction.

The cache tag units 401-A and 401-B look up tags and replace tags when cache lines are invalidated. The cache tag units 401-A and 401-B use the sibling cache masks that are received with the MEMBAR instructions to determine when coherence is restored between sibling caches so that execution of global memory load and store operations following a MEMBAR instruction may be executed. The cache tag units 401-A and 401-B stall global memory load and store operations do not stall any operations during periods of relaxed coherence. Instead stalling is only performed when true memory coherence and the memory ordering fence is needed.

The cache tag units 401-A and 401-B also annotate each MEMBAR instruction to identify the particular cache that received the MEMBAR instruction. The cache tag units 401-A and 401-B output the MEMBAR instruction and the sibling cache mask to a memory request unit (MRU) 406-A and 406-B, respectively. The MRU 406-A and 406-B output the MEMBAR instructions, load requests, and store requests to the arbitration unit 405. The arbitration unit 405 outputs the read and write requests to the MMU 328 and outputs a separate stream of invalidate commands and MEMBAR messages to sibling texture caches. The invalidate commands and MEMBAR messages are generated for each sibling cache specified by the sibling cache mask received with a write request and MEMBAR instruction, respectively. An invalidate command that is included in a stream output by the arbitration unit 405 is a "pending" invalidate command until the pending invalidate command is executed by a cache tag unit 401.

An invalidate command for a cache line is generated by the arbitration unit 405 for each write request to a location in global memory and is inserted into each stream that is output to a sibling cache. The arbitration unit 405 does not insert an invalidate command to the cache from which the write request originated, because a cache is not considered a sibling to itself. The invalidate commands eventually invalidate a cache line in the cache tag units 401-A and/or 401-B. Invalidate commands positioned between any two MEMBAR messages in the stream for a particular texture cache may be reordered, but invalidate commands may not be reordered to be positioned outside of the two MEMBAR messages (i.e., move earlier than or later than the two MEMBAR instructions). A MEMBAR message is output by the arbitration unit 405 to each sibling cache according to the sibling cache mask received with the MEMBAR message.

The cache tag unit 401-A receives MEMBAR instructions from the SM 310-A and receives MEMBAR messages from the arbitration unit 405. Similarly, the cache tag unit 401-B receives MEMBAR instructions from the SM 310-B and MEMBAR messages from the arbitration unit 405. The MEMBAR messages from the arbitration unit 405 are from sibling caches. The MEMBAR instructions received the SMs 310-A and 310-B by the cache tag units 401-A and 401-B, respectively, are matched with the MEMBAR messages received via the arbitration unit 405 from each sibling cache. The matching process tracks the number of MEMBAR messages that are in-flight for each sibling cache, i.e., have been received by a texture unit 315 and not yet been executed. A given cache has to wait until all the MEMBAR messages from sibling caches have been matched with the MEMBAR instruction that the given cache received directly from the SM 310. Once a cache has received MEMBAR messages from all sibling caches that match the MEMBAR instruction, the cache is guaranteed to have received all invalidations from sibling caches prior to the MEMBAR messages. Each sibling cache is considered to have executed the MEMBAR message when the MEMBAR message from the sibling cache is at the head of the stream of invalidate commands and MEMBAR messages, i.e., all prior invalidate commands have been processed by the cache tag unit 401 of the sibling cache. When all of the sibling caches have executed their respective MEMBAR messages, the cache is coherent and global memory accesses are allowed to proceed (i.e., are not stalled). The cache is coherent until a write request modifies the contents of a sibling cache. Importantly, each cache determines when it is coherent independently from when one or more sibling caches determine that they are each coherent.

An invalidate command generated by the arbitration unit 405 may include a single cache line's base address. When one or more invalidate commands for the same cache line occur between two MEMBAR messages in the stream of invalidate commands and MEMBAR messages for a sibling cache, the invalidate commands may be merged into a single invalidate command for the single cache line. Merging multiple invalidate commands into a single invalidate command may reduce the number of clock cycles consumed by the cache tag units 401-A and 401-B to process the invalidate commands. In one embodiment, a content addressable memory (CAM) 410 including at least one entry is used to detect duplicate cache line address invalidate commands, as described in conjunction with FIG. 6D. The CAM 410 resides within the arbitration unit 405 and each entry in the CAM 410 may store both a line address and a sibling mask for an invalidate command. An invalidate command that is stored in the CAM 410 is not inserted into a stream for any of the sibling caches until the invalidate command is evicted from the CAM 410. When the invalidate command is evicted, the invalidate command is inserted into the stream for each sibling cache specified by the sibling mask. In one embodiment each new invalidate command generated by the arbitration unit 405 is stored in the CAM 410 and, if needed, an older invalidate command is evicted from an entry. Using a single CAM 410 for all of the invalidate commands allows bursty traffic from one texture cache to effectively use the entire CAM 410. So the CAM 410 organization is based upon a single entry for a new invalidate command that, when evicted, produces an invalidation command for each sibling cache.

The texture units 315-A and 315-B can process most requests from the SMs 310-A and 310-B even when one or more MEMBAR instructions are in-flight for sibling caches. Read and write requests for locations in non-global memory, texture fetches, and even MEMBAR.CTAs can be processed without waiting for any in-flight MEMBAR messages to complete execution. However, the texture unit 315-A is configured to stall and not process a read or write request for locations in global memory when at least one MEMBAR message is in-flight from a sibling cache (texture cache within the texture unit 315-B). It is necessary to stall the read or write request until all invalidate commands from siblings preceding each in-flight MEMBAR message(s) are processed. After all of the invalidate commands are processed, any read or write request for an invalidated cache line will result in a cache miss. Therefore, the requested data will be retrieved from the backing global memory and the relaxed coherency between the sibling caches is maintained.

Figure 4C:
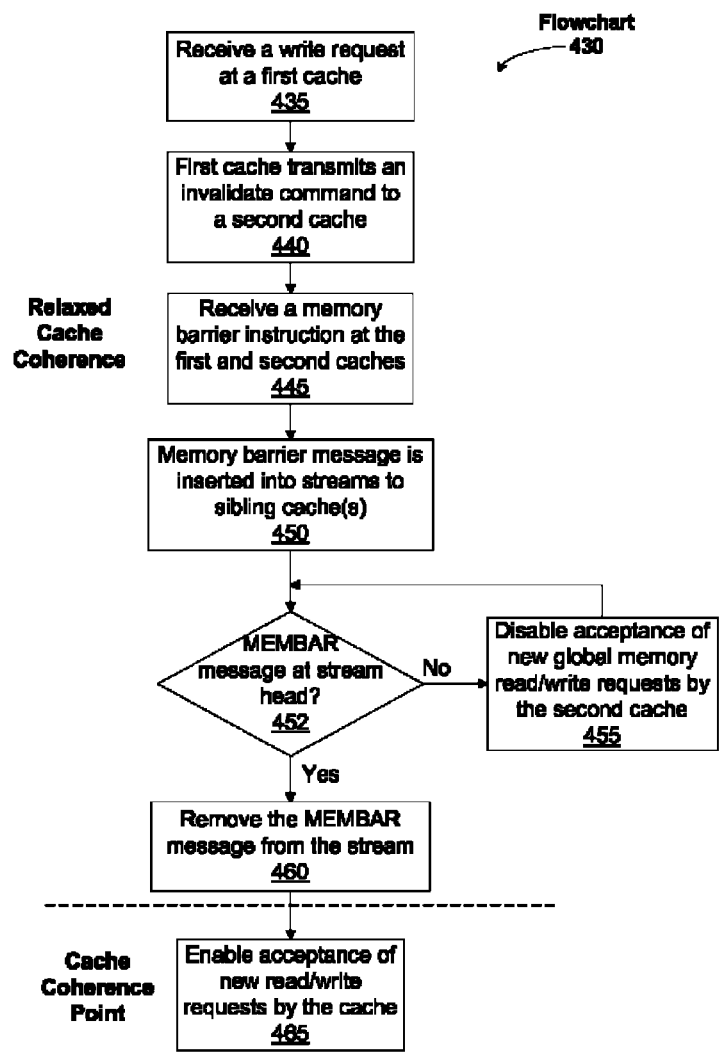
FIG. 4C is a flow diagram of method steps for maintaining relaxed coherency between different caches, according to one embodiment of the present invention.

FIG. 4C is a flow diagram of method steps 430 for maintaining relaxed coherency between different caches, according to one embodiment of the present invention. A first cache is a sibling of a second cache. Although the method steps are described in conjunction with the systems of FIGS. 1, 2, 3A, 3B, and 4B, persons of ordinary skill in the art will understand that any system configured to perform the method steps, in any order, is within the scope of the inventions.

At step 435 the first cache, texture unit 315-A, receives a store (write) request for a location in global memory during a first time period when relaxed coherency is maintained between the first cache residing in the texture unit 315-A and a sibling cache, e.g., the second cache, residing in the texture unit 315-B. The cache tag unit 401-A identifies that the global memory location to be written corresponds to a first cache line of the cache storage 408-A. During the period of relaxed coherency, requests to load from and store to global memory may be processed without requiring coherence between sibling caches. The store request is output by the cache tag unit 401-A to the MRU 406-A and then to the arbitration unit 405.

At step 440 the arbitration unit 405 generates an invalidate command to invalidate an entry in the second cache residing in the texture unit 315-B. The arbitration unit 405 transmits the invalidate command to the sibling cache tag unit 401-B in the stream of invalidate commands and MEMBAR messages for the cache tag unit 401-B. The invalidate commands in the stream are "pending" invalidate commands that will be executed by the sibling cache tag unit 401-B at some time prior to execution of a subsequent (if any) MEMBAR message in the same stream, i.e., during the first time period. There is flexibility as to when the pending invalidate commands are executed in terms of having a short execution latency (a few clock cycles, e.g., 1-10) or a longer execution latency. What is important, is that the pending invalidate commands are executed before the MEMBAR message that follows the pending invalid commands in the stream and indicates the end of the first time period.

Starting with step 445, both texture units 315 behave similarly, though operate independently. For example, both texture units 315 receive a MEMBAR instruction at step 445. Without loss of generality, only the flow of information from texture unit 315-A to texture unit 315-B, and the stalling behavior of texture unit 315-B is described. At step 445 the texture unit 315-A receives a MEMBAR instruction and the cache tag unit 401-A transmits the MEMBAR instruction to the MRU 406-A. The cache tag unit 401-A also performs other actions that are described in further detail in conjunction with FIG. 6A. The MRU 406-A passes the MEMBAR instruction to the arbitration unit 405. At step 450 the arbitration unit identifies sibling caches based on the sibling cache mask provided with the MEMBAR instruction and then inserts the MEMBAR message into the stream(s) corresponding to each sibling cache. At step 452 the cache tag unit 401-B determines if the MEMBAR message is at the head of the stream from the cache tag unit 401-A to cache tag unit 401-B, and, if not, at. At step 455 the cache tag unit 401-B disables acceptance of new global memory read/write requests by the second cache (cache tag unit 401-A) because at least one invalidate command is pending.

Otherwise, no invalidate commands are pending in the stream for the cache tag unit 401-B ahead of the MEMBAR message, and at step 460 the cache tag unit 401-B removes the MEMBAR message from the stream. At step 465, cache tag unit 401-B within the texture unit 315-B enables acceptance of new global memory read or write requests for the second cache.

The MEMBAR instruction is intended to ensure that data written by the write request that was received at step 435 can be read by a read request that is received after the MEMBAR instruction. When the cache tag unit 401 determines that a MEMBAR instruction for a texture unit 315 has received a matching memory barrier message from each of the sibling caches, cache coherence is achieved for the cache. At the point in time when the cache coherence is achieved, the first time period of relaxed cache coherence ends and a new time period of relaxed cache coherence begins. Note that the time periods of relaxed cache coherence are not necessarily synchronized for the different caches, even for sibling caches. It is quite possible that one cache becomes coherent hundreds of cycles before any sibling cache does.

Figure 5A:
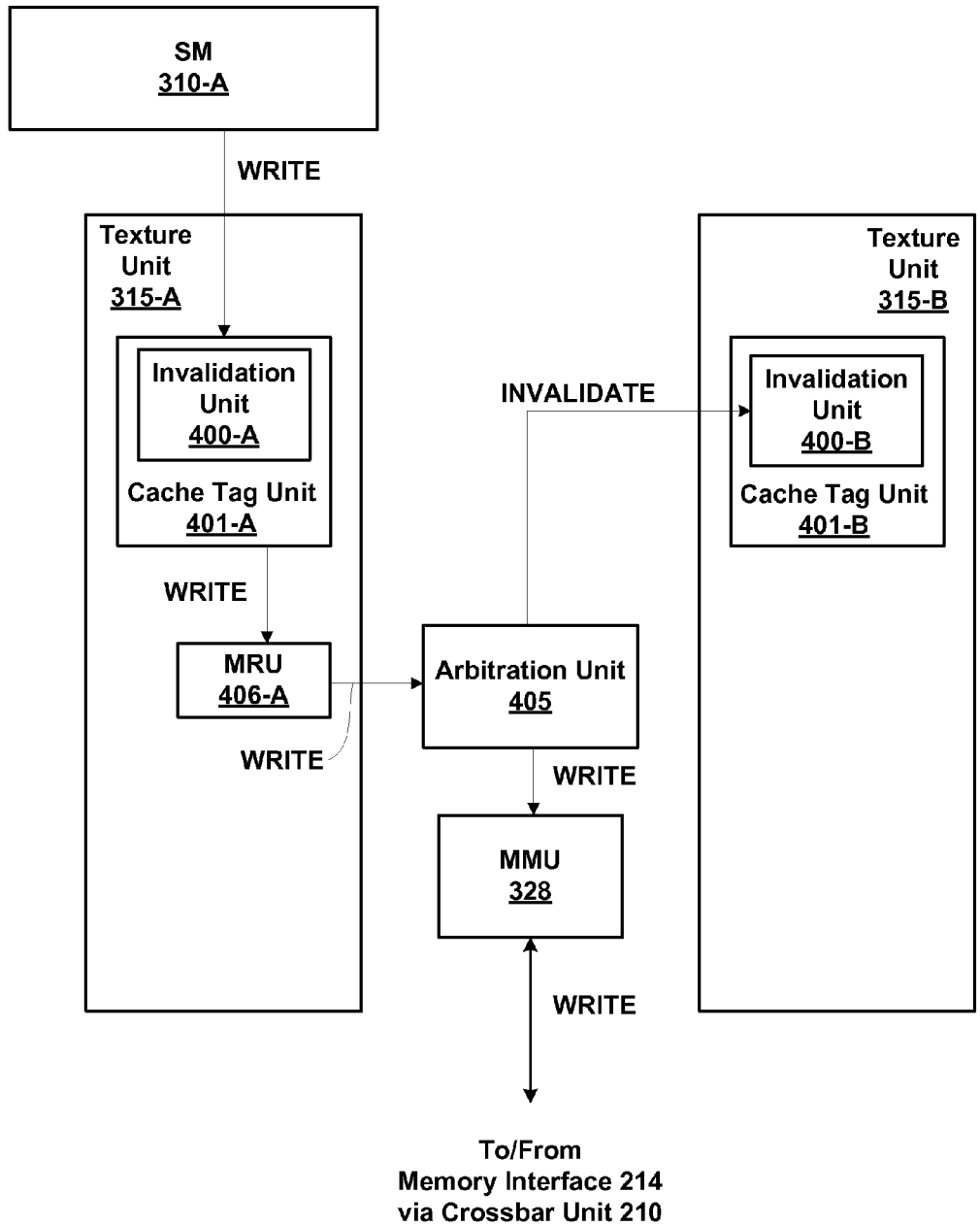
FIG. 5A is block diagram of a portion of the GPC of FIG. 3B illustrating generation of an invalidate signal following a write operation, according to one embodiment of the present invention.

FIG. 5A is block diagram of a portion of the GPC 208 of FIG. 3B illustrating generation of an invalidate command in response to a write request, according to one embodiment of the present invention. The cache tag unit 401-A accepts a write command during a period of relaxed cache coherence. The cache tag unit 401-A transmits the write command to the MRU 406-A which transmits the write command to the arbitration unit 405. The write data and write command are output by the arbitration unit 405 to the MMU 328. The arbitration unit 405 also generates an invalidate command corresponding to the write command and inserts the invalidate command into the stream that is generated for the sibling cache tag unit 401-B.

The invalidate command includes at least a portion of the address (virtual or physical) needed to identify a cache line in the cache tag unit 401-B corresponding to the location to be written by the write request. The invalidation unit 400-B within the cache tag unit 401-B receives the invalidate command and processes the invalidate command immediately or at a later point in time. When the invalidate command is processed by the invalidation unit 400, the cache tag unit 401-B invalidates a cache line that stores data written in the location specified by the write request. Note, that it is possible that no cache line stores data corresponding to the location specified by the write request, in which case the cache tag unit 401-B does not invalidate a cache line. The invalidation unit 400-A performs a similar function as the invalidation unit 400-B for the cache tag unit 401-A. In one embodiment, the cache tag unit 401-B can look up multiple tags simultaneously. Such an embodiment, reorders and eliminates redundant invalidate commands between MEMBAR messages to reduce the number of cycles spent processing invalidate commands. Additionally, invalidate commands may be processed simultaneously with ordinary tag lookups.

Figure 5B:
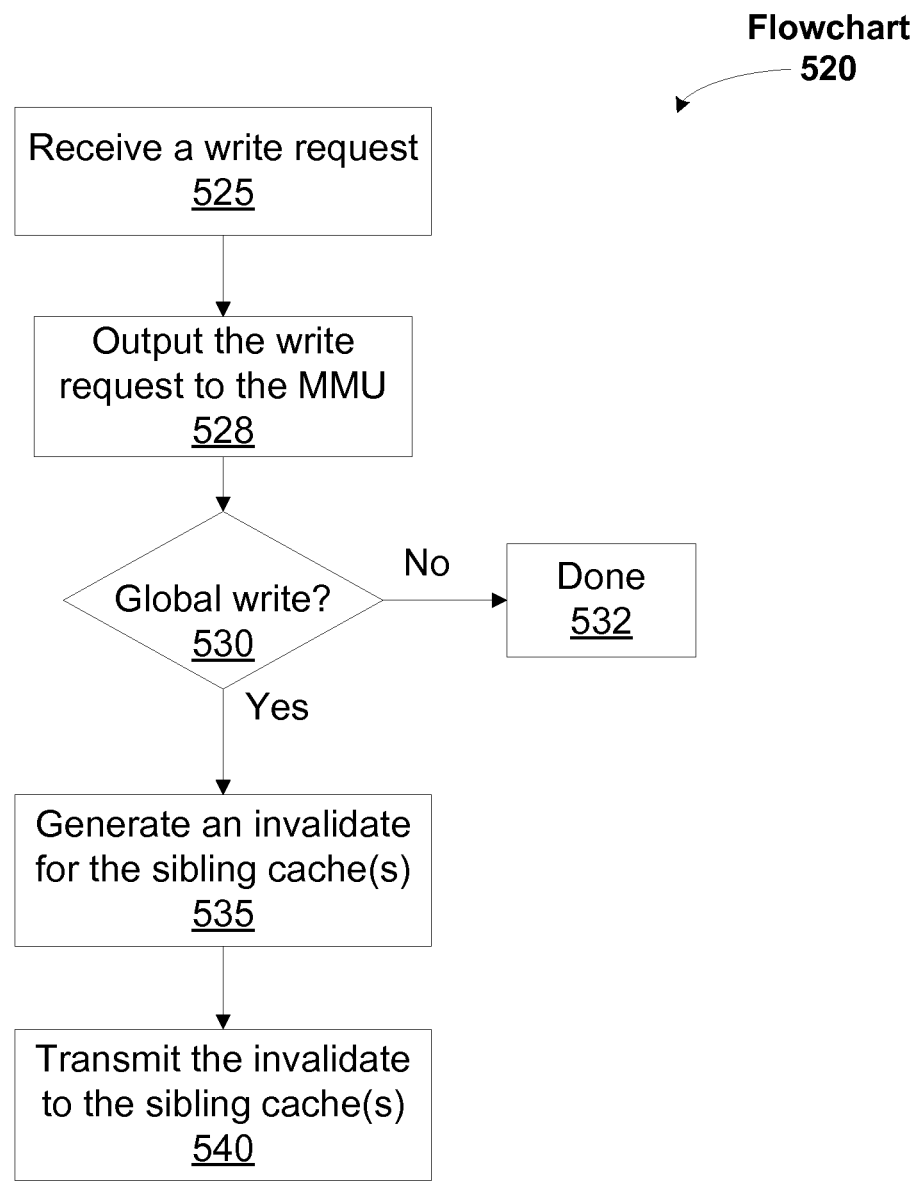
FIG. 5B is a flow diagram of method steps for maintaining relaxed coherency between different caches when a write request is received, according to one embodiment of the present invention.

FIG. 5B is a flow diagram of method steps for maintaining relaxed coherency between different caches when a write request is received, as shown in FIG. 5A, according to one embodiment of the present invention. Although the method steps are described in conjunction with the systems of FIGS. 1, 2, 3A, 3B, 4B, and 5A, persons of ordinary skill in the art will understand that any system configured to perform the method steps, in any order, is within the scope of the inventions.

At step 525 the cache tag unit 401-A receives and accepts a write request during a period of relaxed cache coherence (acceptance of new read/write requests is enabled). At step 528 the cache tag unit 401-A transmits the write request to the MRU 406-A which transmits the request to the arbitration unit 405. The arbitration unit 405 then outputs the write request to the MMU 328. At step 530 the arbitration unit 405 determines if the write request specifies a location in the global memory space, and, if not, then processing of the write request is complete. The arbitration unit 405 does not generate an invalidate command because sibling cache coherence is not required for other memory spaces. In some embodiments, data for other memory spaces cannot be stored in the cache storages 408. Note that step 528 may occur after step 530 as long as the arbitration unit 405 maintainsmemory request order.

If, at step 530 the cache tag unit 401-A determines the write request specifies a location in the global memory space, then at step 535 the cache tag unit 401-A transmits the write command to the arbitration unit 405 via the MRU 406-A and the arbitration unit 405 generates an invalidate command corresponding to the write request. The arbitration unit 405 inserts the invalidate command into the stream that is generated for the sibling cache tag unit 401-B. The invalidation unit 400-B receives the invalidate command and processes the invalidate command immediately or at a later point in time. At step 540, when the invalidate command is processed by the invalidation unit 400-B, the cache tag unit 401-B invalidates a cache line that stores data written in the location specified by the write request.

Figure 6A:
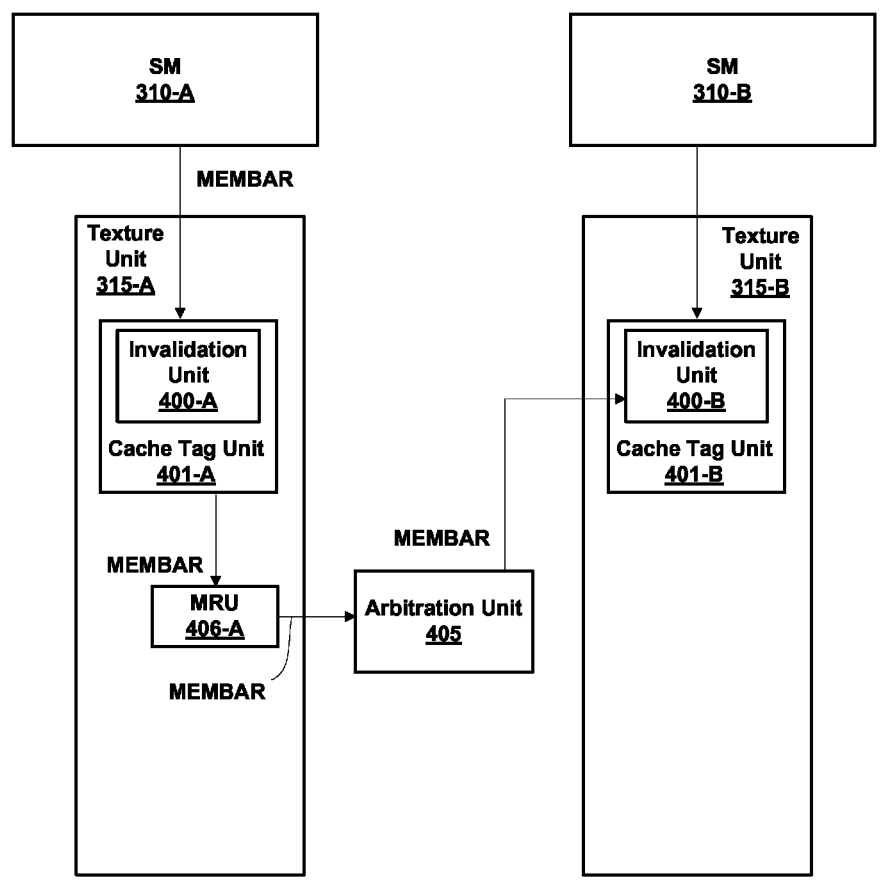
FIG. 6A is block diagram of a portion of the GPC of FIG. 3B illustrating the processing of a MEMBAR instruction, according to one embodiment of the present invention.

FIG. 6A is block diagram of a portion of the GPC 208 of FIG. 3B illustrating the processing of a MEMBAR instruction, according to one embodiment of the present invention. The cache tag unit 401-A receives a MEMBAR instruction. In response to receiving the MEMBAR instruction, the cache tag unit 401-A generates an increment count signal that is provided to the invalidation unit 400-A along with the sibling cache mask. The increment count signal increments a count of pending MEMBAR messages that have been received and not yet processed by each sibling cache according to the sibling cache mask. The invalidation unit 400-A maintains a count of pending MEMBAR messages from each potential sibling cache for the texture cache that resides in each texture unit 315. The count of pending MEMBAR messages for the potential sibling caches is provided to each texture unit 315 as "pending MEMBAR count", where a potential sibling cache is a texture cache within any texture unit 315 other than the texture unit 315 itself. In other words, a texture cache residing in the texture unit 315-A is a sibling texture cache for the texture unit 315-B and is not a sibling texture cache for the texture unit 315-A. Although only two texture units 315 are shown and described in FIGS. 4B, 5A, and 6A additional texture units 315 may be used in other embodiments, and those additional texture units 315 may include additional sibling texture caches. For example, if there are four texture caches, each with three siblings, then each of the four texture caches has a set of three "pending MEMBAR counters" for a total of twelve counters.

The cache tag unit 401-A transmits the MEMBAR instruction to the MRU 406-A which transmits the MEMBAR instruction to the arbitration unit 405. The arbitration unit 405 inserts the MEMBAR message into the stream that is generated for each sibling cache according to the sibling cache mask that is included in the MEMBAR instruction. In the example shown in FIG. 6A, the cache tag unit 401-A generates an increment signal (INC COUNT) that increments the counter within invalidation unit 400-A tracking pending MEMBAR messages from texture unit 315-B. Because the MEMBAR instruction is output to both texture units 315, the invalidation unit 400-B will increment a separate counter that tracks pending MEMBAR messages from texture unit 315-A.

The MEMBAR instruction is a fence between other I/O instructions, and so the increment operation is performed when each respective cache tag unit 401 receives a MEMBAR instruction from an SM 310. The arbitration unit 405 inserts a MEMBAR message corresponding to the MEMBAR instruction received from the texture unit 315-A into the stream that is output to the invalidation unit 400-B that tracks pending MEMBAR messages from texture unit 315-A. The invalidation unit 400-B decrements the pending MEMBAR counter for the sibling texture cache within texture unit 315-A when the MEMBAR message is processed (after transmitting any invalidate commands from the texture unit 315-A that were ahead of the MEMBAR message in the stream). After being incremented and then decremented, the pending MEMBAR count is restored to the initial value (presumably zero) and the texture cache residing in the texture unit 315-B is coherent. The use of a counter allows for multiple MEMBAR messages to be pending at any time.

Figure 6B:
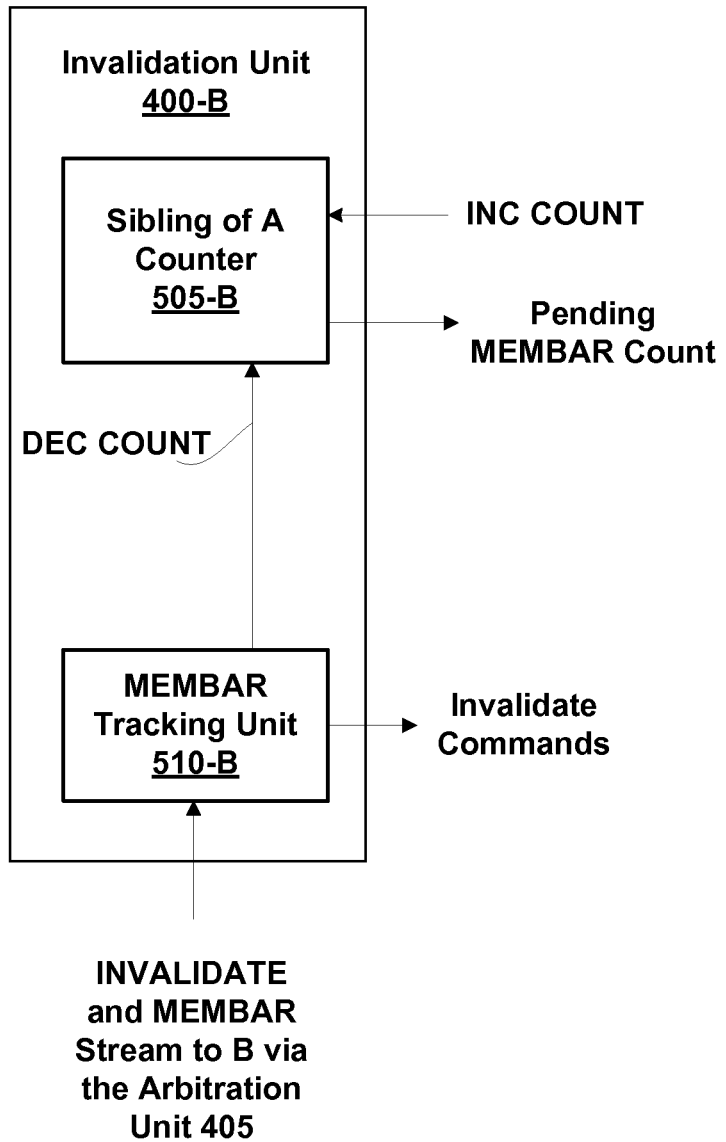
FIG. 6B is block diagram of an invalidation unit, according to one embodiment of the present invention.

FIG. 6B is a block diagram of an invalidation unit 400-B, according to one embodiment of the present invention. Invalidation unit 400-A is similar to invalidation unit 400-B and performs the MEMBAR tracking functions for the texture unit 315-A. The invalidation unit 400-B includes a MEMBAR tracking unit for each potential sibling texture cache, e.g., MEMBAR tracking unit 510-B. The invalidation unit 400-B also includes a counter for each potential sibling texture cache, e.g., sibling of A counter 505-B. In one embodiment, the sibling of A counter 505-B is a small (e.g., 5- or 6-bit) signed counter. If a counter saturates to either a minimum or a maximum possible value, then the invalidation unit 400 should be configured to stall either the stream that decrements the counter or the cache tag unit 315 that increments the counter, respectively. A signed counter allows negative values. A negative value indicates that a sibling cache has already processed one or more MEMBAR messages and pushed all invalidates before each MEMBAR message through the texture cache, before the texture cache has processed the corresponding MEMBAR instructions. The texture cache is already coherent with respect to the sibling cache. In other words, when the pending MEMBAR count output by sibling of A counter 505-B is negative, the texture cache within texture unit 315-B is already coherent with respect to the sibling texture cache within texture unit 315-A.

The MEMBAR tracking unit 510-B receives the stream of invalidate commands and MEMBAR messages that is generated by the arbitration unit 405 for the texture unit 315-B. The invalidate commands received by MEMBAR tracking unit 510-B are used by the cache tag unit 401-B to invalidate cache lines. When a MEMBAR instruction is received by the MEMBAR tracking unit 510-B, a decrement signal (DEC COUNT) is generated and output to the sibling of A counter 505-B after all of the proceeding invalidate commands are output to and processed by the cache tag unit 401-B. As previously explained, the sibling of A counter 505-B is incremented when the cache tag unit 401-B receives a MEMBAR instruction and the sibling of A counter 505-B is decremented when the MEMBAR tracking unit 510-B outputs a DEC COUNT signal. The sibling of A counter 505-B provides a pending MEMBAR count to the cache tag unit 401-B indicating the number of pending MEMBAR instructions for the sibling texture cache residing within the texture unit 315-A.

Although the examples only illustrate two texture units, additional texture units may be configured to process a single CTA, necessitating coordination between more than two texture caches to maintain relaxed coherency between the different caches storing data for the CTA. For example, if a CTA is processed by 4 different SMs 310 that are each coupled to a different texture unit 315 so that four different texture caches are used to process the CTA, each invalidation unit 400 maintains 3 sibling counters 505 (one for each possible sibling cache) for each texture unit 315 for a total of 12 sibling counters 505. When a MEMBAR instruction output by an SM 310 is received by a cache tag unit 401, the cache tag unit 401 increments each sibling counter 505 that corresponds to a sibling cache for the particular cache tag unit 401.

Figure 6C:
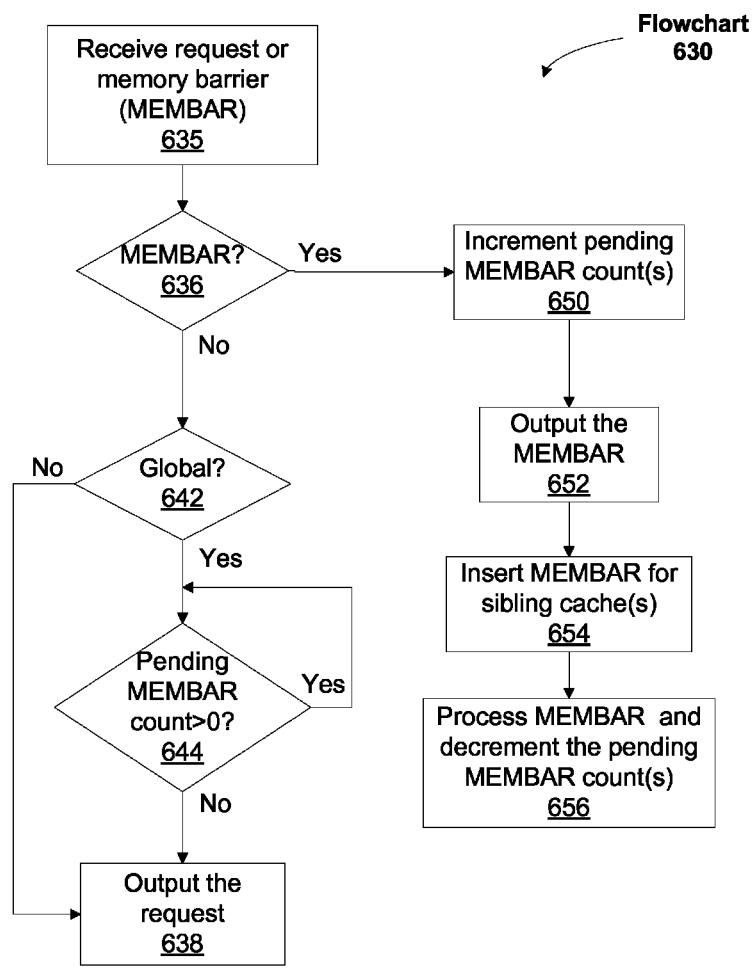
FIG. 6C is a flow diagram of method steps for processing a MEMBAR instruction, according to one embodiment of the present invention.

FIG. 6C is a flow diagram 630 of method steps for processing a MEMBAR instruction, according to one embodiment of the present invention. Although the method steps are described in conjunction with the systems of FIGS. 1, 2, 3A, 3B, 4B, 6A, and 6B, persons of ordinary skill in the art will understand that any system configured to perform the method steps, in any order, is within the scope of the inventions.

At step 635 a texture unit 315 receives a (read or write) request or a MEMBAR instruction. At step 636, the texture unit 315 determines if a MEMBAR instruction was received, and, if not, at step 642 the texture unit 315 determines if the read or write request specifies a location in the global memory space. If at step 642, the texture unit 315 determines that the request is not for the global memory space, then at step 646 the texture unit 315 provides the read or write request to the cache tag unit 401 for processing. Otherwise, at step 644 the texture unit 315 determines if any of the pending MEMBAR counts for a sibling texture cache is greater than zero (indicating that at least one MEMBAR instruction is pending from a sibling texture cache). Step 644 is repeated while at least one pending MEMBAR count is greater than zero. When all pending MEMBAR counts of the sibling texture caches are zero or negative, the texture unit 315 proceeds to step 646 and provides the read or write request to the cache tag unit 401 for processing.

At step 650 the texture unit 315 generates an INC COUNT signal that is output to the invalidation unit 400 to increment the sibling counters 505 for one or more sibling texture caches. At step 652 the cache tag unit 401 outputs the MEMBAR instruction to the arbitration unit 405 via the MRU 406 (the MEMBAR instruction follows any other memory access requests). At step 654 the arbitration unit 405 inserts a MEMBAR message corresponding to the MEMBAR instruction in the stream for each sibling texture cache. At step 656 the invalidation unit 400 processes the MEMBAR messages(s) in the streams for the sibling texture caches and generates a decrement signal for each sibling counter 505 corresponding to a sibling texture cache. The pending MEMBAR messages are separately tracked for each sibling cache.

Multiple MEMBAR messages may be pending from a sibling texture cache and the texture units 315 are configured to stall tag lookup in cache tag unit 401 when the input is a read or write request to the global memory space. Stalling cache tag lookups reduces the number of cycles during which read and write requests are stalled compared with stalling read and write requests at the output of the SM 310. If cache tag lookups are stalled for many clock cycles pipeline buffers between the cache tag lookup and the SM 310 output may fill and the SM 310 will need to stall at the output. Other requests are accepted and processed by the texture unit 315 when one or more MEMBAR instructions from any sibling are pending.

In one embodiment, a synchronization instruction (BAR.SYNC) is used that includes an implicit MEMBAR.CTA. Every warp in a CTA will issue a BAR.SYNC instruction, meaning that each thread in a CTA will execute a MEMBAR.CTA and the SMs 310 will transmit MEMBAR.CTA instructions to each sibling texture unit 315, resulting in a proliferation of MEMBAR instructions being received by the texture units 315. Rather than generating MEMBAR.CTA instructions for each sibling SM 310, no MEMBAR.CTA is issued until the very last warp reaches the BAR.SYNC instruction. At that point the threads in the CTA are synchronized and a single MEMBAR.CTA instruction is issued and to each texture unit 315 in the CTA.

Figure 6D:
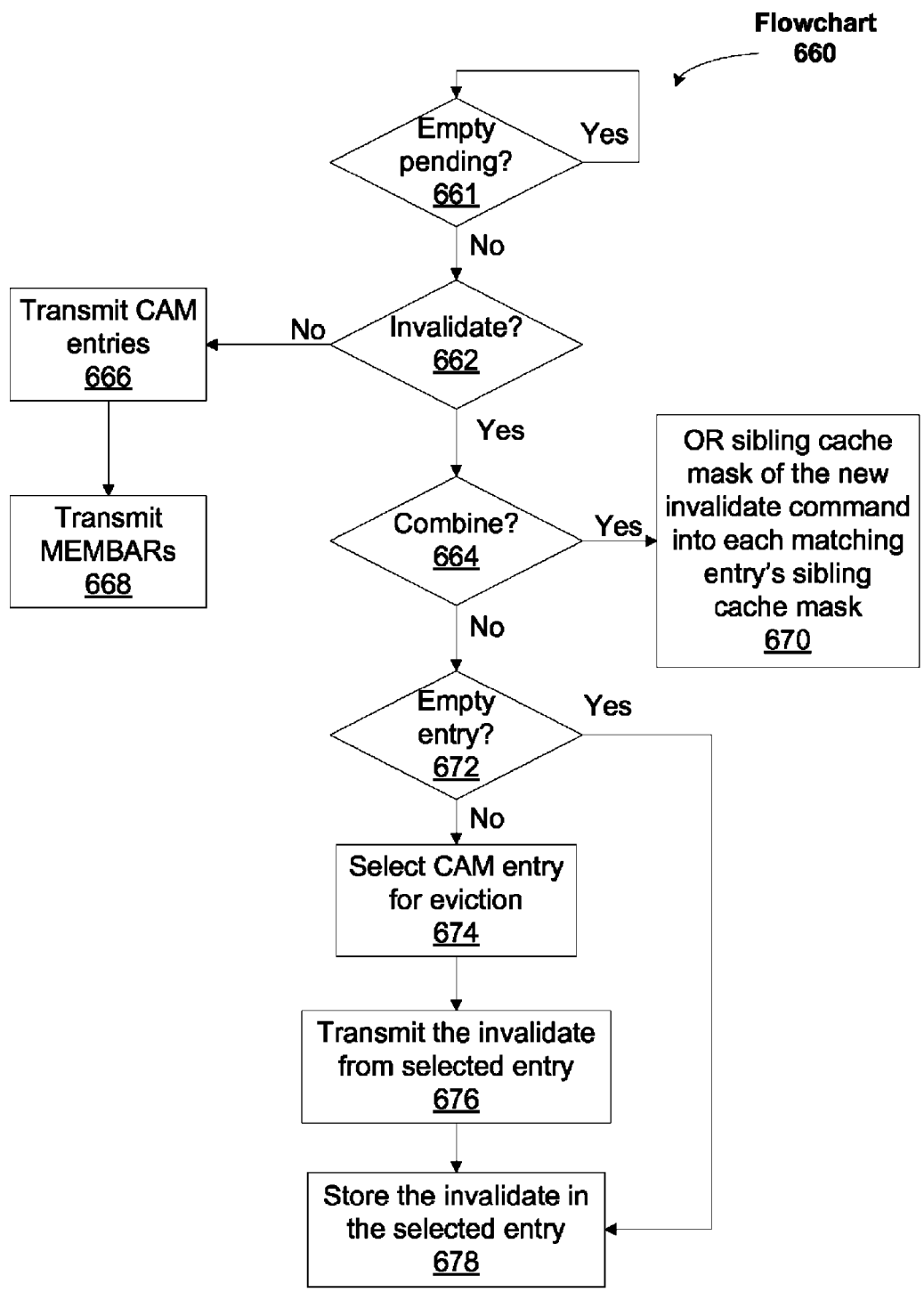
FIG. 6D is a flow diagram of method steps for combining invalidate commands, according to one embodiment of the present invention.

FIG. 6D is a flow diagram 660 of method steps for combining invalidate commands, according to one embodiment of the present invention. Although the method steps are described in conjunction with the systems of FIGS. 1, 2, 3A, 3B, 4B, 6A, and 6B, persons of ordinary skill in the art will understand that any system configured to perform the method steps, in any order, is within the scope of the inventions.

At step 661 the arbitration unit 405 determines if a invalidate command or MEMBAR message is generated, and if not, step 661 is repeated. Otherwise, at step 662, the arbitration unit 405 determines if the generated command or MEMBAR message for insertion in one or more streams is an invalidate command. If not, then the first command or instruction in the stream must be a MEMBAR message, and at step 666 the arbitration unit 405 evicts all of the occupied entries from the CAM 410 and inserts the evicted invalidate commands into the streams output to the invalidation units 400 according to the sibling cache masks stored with each invalidate command. Then, at step 668, the arbitration unit 405 generates a MEMBAR message corresponding to the MEMBAR instruction and inserts the MEMBAR message into the streams according to the sibling cache mask received with the MEMBAR instruction.

If, at step 662, the invalidation unit 400 determines that the command or message in the stream is an invalidate command, then at step 664, the invalidation unit 400 determines if the invalidate command can be combined with another (older) invalidate command because the two invalidate commands are associated with a single cache line. An invalidate command can be combined with another invalidate command when the new invalidate command matches an entry in the CAM 410 that stores invalidate commands generated by the arbitration unit 405. If the invalidate command can be combined with another invalidate command, then at step 670 the sibling cache mask of the new invalidate command is bit wise ORed into the sibling cache mask stored in the matching entry of the CAM 410. When each texture unit 315 only has one potential sibling, the new invalidate command may be discarded in step 670.

If, at step 664, the invalidate command cannot be combined with another invalidate command, then at step 672 the arbitration unit 405 determines if an empty entry is available in the CAM 410. If an empty entry is available, then at step 678 the invalidate command is stored in the selected (empty) entry. Otherwise, at step 674 an entry that stores an older invalidate command is selected for eviction from the CAM 410. At step 676 the evicted invalidate command is inserted into the stream(s) output to the invalidation unit(s) 400 according to the sibling cache mask stored with the evicted invalidate command. At step 678 the new invalidate command is stored in the selected entry.

The ability to maintain relaxed coherency enables two different execution units to be configured to execute multiple threads of a single thread group and use two different caches. The first execution unit accesses a first cache and the second unit accesses a second cache. The first cache and the second cache may store one or more cache lines corresponding to the same memory address. During time periods between memory barrier instructions relaxed coherency is maintained between the first cache and the second cache. More specifically, during a period of relaxed coherency writes to a cache line in the first cache that corresponds to a particular memory address are not necessarily propagated to a cache line in the second cache before the second cache receives a read or write request that also corresponds to the particular memory address. Therefore, the first cache and the second are not necessarily coherent during time periods of relaxed coherency. During the period of relaxed coherency, an invalidate command is transmitted by the first cache for each write request that is received by the first cache to generate a pending invalidate command for the second cache. When a memory barrier instruction is received by the first cache, the first cache does not accept any new read or write requests until after determining that the second cache has sent all pending invalidate commands to the first cache, and the first cache has processed all such invalidate commands. Execution of the memory barrier instruction by the first cache ensures that the first cache is coherent with all writes into the second cache before a new period of relaxed coherency begins.

An advantage of the relaxed cache coherency is that any latency resulting from restoring coherency between the different caches is only incurred when a load or store operation for the global memory space is received and a cache has not received and/or processed all invalidate commands generated by sibling caches before a MEMBAR message. The invalidate commands resulting from store operations to the global memory space may be processed immediately or at a later time during a period of relaxed coherency and redundant invalidate commands may be combined.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A computer-implemented method for maintaining relaxed coherency between a first cache and a second cache, the method comprising:
  receiving a write request corresponding to a first cache line of the first cache during a first time period when relaxed coherency is maintained between the first cache and the second cache;
  transmitting to the second cache an invalidate command that is based on the write request to generate a pending invalidate command for execution by the second cache, wherein the pending invalidate command is executed by the second cache at any time during the first time period;
receiving a memory barrier instruction configured to ensure that data written by the write request can be read by a read request that is received after the barrier instruction; and
determining that the pending invalidate command is executed by the second cache to complete execution of the memory barrier instruction and end the first time period before the second cache accepts either a new read request or a new write request.

2. The method of claim 1, further comprising receiving a sibling cache mask identifying at least the second cache and a third cache as sibling caches of the first cache.

3. The method of claim 2, further comprising transmitting the invalidate command to the third cache to generate a second pending invalidate command for execution by the third cache that is executed by the third cache at any time during the first time period.

4. The method of claim 3, further comprising determining that the second pending invalidate command is executed by the third cache before the third cache accepts either a new read request or a new write request to complete execution of the memory barrier instruction and end the first time period.

5. The method of claim 1, wherein a first memory barrier command corresponding to the memory barrier instruction is generated and output to the second cache following the invalidate command.

6. The method of claim 5, further comprising tracking, by the first cache, a difference between a number of memory barrier instructions received by the first cache including the memory barrier instruction and a number of memory barrier commands that have been executed by the second cache including the first memory barrier command.

7. The method of claim 1, further comprising:
determining that the pending invalidate command is configured to invalidate a first cache line of the second cache;
determining that a previously pending invalidate command is also configured to invalidate the first cache line of the second cache; and
combining the pending invalidate command with the previously pending invalidate command.

8. The method of claim 1, further comprising determining that the write request specifies a location in a global memory space, and wherein the new read request or the new write request that specifies a location in the global memory space is not accepted before the pending invalidate command is executed by the second cache.

9. The method of claim 1, further comprising:
determining that the write request specifies a location in a global memory space;
receiving, after the memory barrier instruction, an additional read request or an additional write request that specifies a location that is not within the global memory space; and
accepting the additional read request or the additional write request before the pending invalidate command is executed by the second cache.

10. The method of claim 1, further comprising invalidating a cache line in the second cache to execute the pending invalidate command and complete execution of the memory barrier instruction.

11. A processing subsystem comprising:
a first cache that is configured to:
receive a write request corresponding to a first cache line of the first cache during a first time period when relaxed coherency is maintained between the first cache and a second cache;
transmit, to the second cache, an invalidate command that is based on the write request to generate a pending invalidate command for execution by the second cache, wherein the pending invalidate command is executed by the second cache at any time during the first time period;
receive a memory barrier instruction configured to ensure that data written by the write request can be read by a read request that is received after the barrier instruction; and
determine that the pending invalidate command is executed by the second cache to complete execution of the memory barrier instruction and end the first time period before the second cache accepts either a new read request or a new write request; and
the second cache that is configured to execute the pending invalidate command at any time during the first time period.

12. The processing subsystem of claim 11, further comprising a third cache, wherein the first cache is further configured to receive a sibling cache mask identifying at least the second cache and the third cache as sibling caches of the first cache.

13. The processing subsystem of claim 12, wherein the first cache is further configured to transmit the invalidate command to the third cache to generate a second pending invalidate command for execution by the third cache that is executed by the third cache at any time during the first time period.

14. The processing subsystem of claim 13, wherein the first cache is further configured to determine that the second pending invalidate command is executed by the third cache before the third cache accepts either a new read request or a new write request to complete execution of the memory barrier instruction and end the first time period.

15. The processing subsystem of claim 11, wherein the first cache is further configured to:
determine that the pending invalidate command is configured to invalidate a first cache line of the second cache;
determine that a previously pending invalidate command is also configured to invalidate the first cache line of the second cache; and
combining the pending invalidate command with the previously pending invalidate command.

16. The processing subsystem of claim 11, wherein the first cache is further configured to determine that the write request specifies a location in a global memory space, and wherein the new read request or the new write request that specifies a location in the global memory space is not accepted before the pending invalidate command is executed by the second cache.

17. The processing subsystem of claim 11, wherein the first cache is further configured to:
determine that the write request specifies a location in a global memory space;
receive, after the memory barrier instruction, an additional read request or an additional write request that specifies a location that is not within the global memory space; and
accept the additional read request or the additional write request before the pending invalidate command is executed by the second cache.

18. The processing subsystem of claim 11, wherein the first cache is further configured to invalidate a cache line in the second cache to execute the pending invalidate command and complete execution of the memory barrier instruction.

19. The processing subsystem of claim 11, further comprising an invalidation unit that is coupled to the first cache and the second cache and is configured to track a difference between pending memory barrier instructions that have been received by the first cache and not completed execution by the second cache.

20. A computing system, comprising:
   a parallel processing subsystem comprising:
      a first cache that is configured to:
         receive a write request corresponding to a first cache line of the first cache during a first time period when relaxed coherency is maintained between the first cache and a second cache;
         transmit, to the second cache, an invalidate command that is based on the write request to generate a pending invalidate command for execution by the second cache, wherein the pending invalidate command is executed by the second cache at any time during the first time period;
         receive a memory barrier instruction configured to ensure that data written by the write request can be read by a read request that is received after the barrier instruction; and
         determine that the pending invalidate command is executed by the second cache to complete execution of the memory barrier instruction and end the first time period before the second cache accepts either a new read request or a new write request; and
      the second cache that is configured to execute the pending invalidate command at any time during the first time period.

* * * * *